United States Patent
Bunker

(10) Patent No.: US 7,967,559 B2
(45) Date of Patent: *Jun. 28, 2011

(54) STATOR-ROTOR ASSEMBLY HAVING SURFACE FEATURE FOR ENHANCED CONTAINMENT OF GAS FLOW AND RELATED PROCESSES

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/755,588

(22) Filed: May 30, 2007

(65) Prior Publication Data

US 2008/0298969 A1    Dec. 4, 2008

(51) Int. Cl.
*F01D 11/02* (2006.01)
*F01D 5/14* (2006.01)
*F01D 5/22* (2006.01)
*F01D 9/02* (2006.01)
*F02C 7/28* (2006.01)

(52) U.S. Cl. .................... 415/173.7; 415/170.1

(58) Field of Classification Search ........... 415/170.1, 415/173.7, 174.2, 174.3; 416/228, 235, 236 R
See application file for complete search history.

(56) References Cited

U.S. PATENT DOCUMENTS

| | | | |
|---|---|---|---|
| 3,262,635 A * | 7/1966 | Smuland | 417/355 |
| 4,682,933 A * | 7/1987 | Wagner | 415/173.5 |
| 5,222,742 A * | 6/1993 | Roberts | 277/420 |
| 5,224,822 A | 7/1993 | Lenahan et al. | |
| 5,967,745 A * | 10/1999 | Tomita et al. | 415/173.7 |
| 6,027,306 A | 2/2000 | Bunker | |
| 6,350,102 B1 * | 2/2002 | Bailey et al. | 415/173.5 |
| 6,419,446 B1 | 7/2002 | Kvasnak et al. | |
| 6,504,274 B2 | 1/2003 | Bunker et al. | |
| 6,506,016 B1 | 1/2003 | Wang | |
| 6,644,921 B2 | 11/2003 | Bunker et al. | |
| 6,830,428 B2 * | 12/2004 | Le Biez et al. | 415/173.4 |
| 6,910,852 B2 | 6/2005 | Simeone et al. | |
| 7,104,067 B2 | 9/2006 | Bunker | |
| 2001/0031201 A1 * | 10/2001 | Lawer et al. | 415/173.4 |
| 2002/0182069 A1 * | 12/2002 | Irie et al. | 415/182.1 |
| 2003/0228223 A1 * | 12/2003 | Bunker et al. | 416/97 R |
| 2004/0100035 A1 * | 5/2004 | Turnquist et al. | 277/412 |

OTHER PUBLICATIONS

R.S. Bunker et al., "Method of Forming Concavities in the Surface of a Metal Component, and Related Processes and Articles," U.S. Appl. No. 10/841,366, filed May 6, 2004.

R.S. Bunker, Stator-Rotor Assemblies Having Surface Features for Enhanced Containment of Gas Flow, and Related Processes, GE Docket No. 155542-1.

R.S. Bunker, Stationary-Rotating Assemblies Having Surface Features for Enhanced Containment of Fluid Flow, and Related Processes, GE Docket No. 155542-2.

* cited by examiner

*Primary Examiner* — Edward Look
*Assistant Examiner* — Jesse Prager
(74) *Attorney, Agent, or Firm* — Ann M. Agosti

(57) ABSTRACT

A stator-rotor assembly which includes at least one interface region between the stator and rotor is described. At least one stator or rotor surface in the interface region includes a pattern of inverted turbulators. The inverted turbulators restrict gas flow through a gap between the stator and the rotor. Various turbomachines which can contain such a stator-rotor assembly are also described. The disclosure also discusses methods to restrict gas flow through gaps in a stator-rotor assembly utilizing the inverted turbulators.

19 Claims, 6 Drawing Sheets

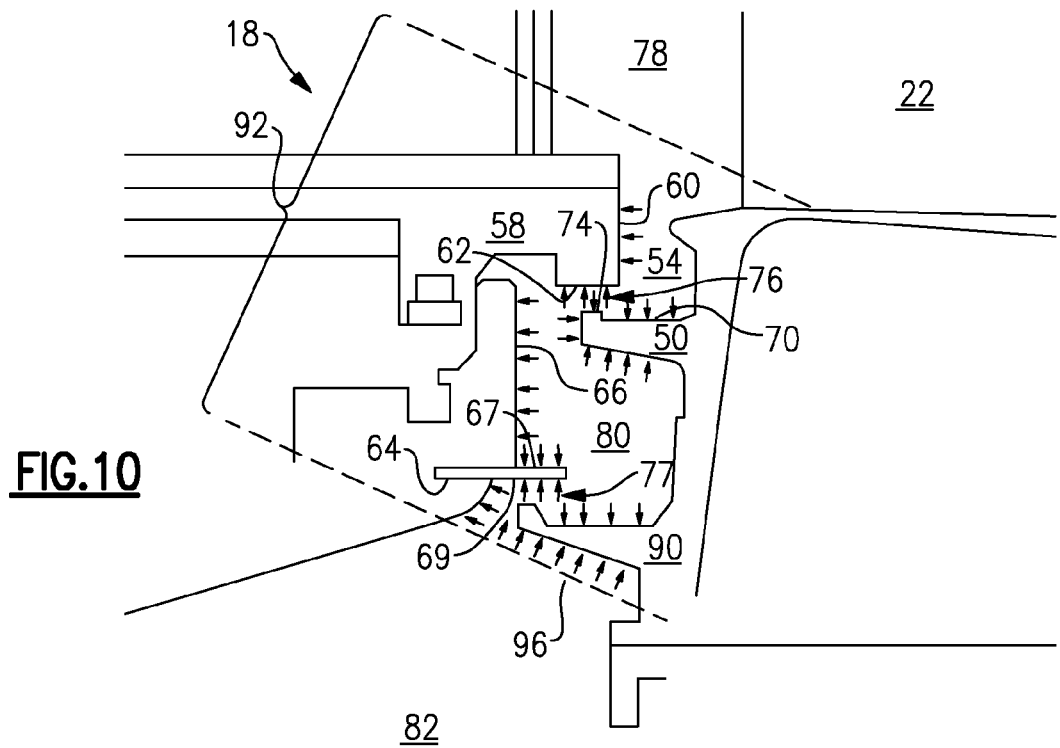
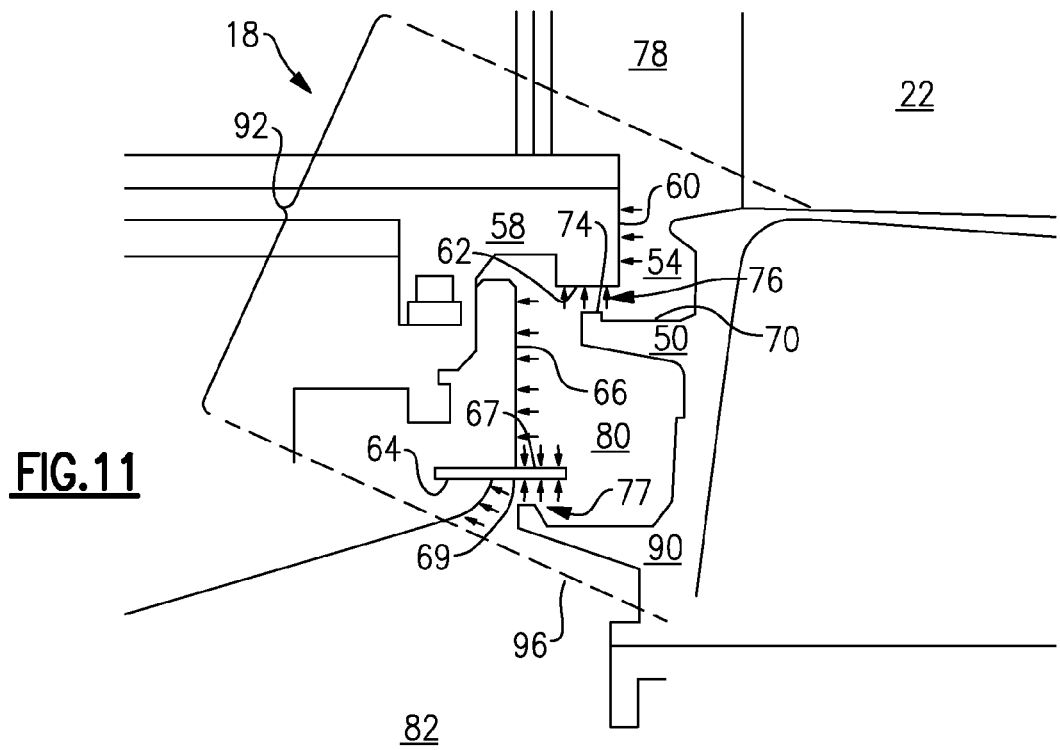

STATOR-ROTOR ASSEMBLY HAVING SURFACE FEATURE FOR ENHANCED CONTAINMENT OF GAS FLOW AND RELATED PROCESSES

BACKGROUND OF THE INVENTION

This invention relates generally to turbomachines, such as turbine engines. More specifically, the invention is directed to methods and articles for impeding the flow of gas (for example, hot gas) through selected regions of stator-rotor assemblies in turbomachines.

The typical design of most turbine engines is well-known in the art. They include a compressor for compressing air that is mixed with fuel. The fuel-air mixture is ignited in an attached combustor, to generate combustion gases. The hot, pressurized gases, which in modern engines can be in the range of about 1100 to 2000° C., are allowed to expand through a turbine nozzle, which directs the flow to turn an attached, high-pressure turbine. The turbine is usually coupled with a rotor shaft, to drive the compressor. The core gases then exit the high pressure turbine, providing energy downstream. The energy is in the form of additional rotational energy extracted by attached, lower pressure turbine stages, and/or in the form of thrust through an exhaust nozzle.

More specifically, thermal energy produced within the combustor is converted into mechanical energy within the turbine, by impinging the hot combustion gases onto one or more bladed rotor assemblies. (Those versed in the art understand that the term "blades" is usually part of the lexicon for aviation turbines, while the term "buckets" is typically used when describing the same type of component for land-based turbines). The rotor assembly usually includes at least one row of circumferentially-spaced rotor blades. Each rotor blade includes an airfoil that includes a pressure side and a suction side. Each airfoil extends radially outward from a rotor blade platform. Each rotor blade also includes a dovetail that extends radially inward from a shank extending between the platform and the dovetail. The dovetail is used to mount the rotor blade within the rotor assembly to a rotor disk or spool.

As known in the art, the rotor assembly can actually be considered as a portion of a stator-rotor assembly. The rows of rotor blades on the rotor assembly and the rows of stator vanes on the stator assembly extend alternately across an axially oriented flowpath for "working" the combustion gases. The jets of hot combustion gas leaving the vanes of the stator element act upon the turbine blades, and cause the turbine wheel to rotate in a speed range of about 3000-15,000 rpm, depending on the type of engine. (Again, in terms of parallel terminology, the stator element, that is, the element which remains stationary while the turbine rotates at high speed, can also be referred to in the art as the "nozzle assembly").

As depicted in the figures described below, the opening at the interface between the stator element and the blades or buckets can allow hot core gas to exit the hot gas path and enter the wheel-space of the turbine engine. In order to limit this leakage of hot gas, the blade structure typically includes axially projecting angel wing seals. According to a typical design, the angel wings cooperate with projecting segments or "discouragers" which extend from the adjacent stator element, that is, the nozzle. The angel wings and the discouragers overlap (or nearly overlap), but do not touch each other, thus restricting gas flow. The effectiveness of the labyrinth seal formed by these cooperating features is critical for limiting the ingestion of hot gas into undesirable sections of the engine. The angel wings can be of various shapes, and can include other features, such as radial teeth. Moreover, some engine designs use multiple, overlapping angel wing-discourager seals.

A gap remains at the interface between adjacent regions of the nozzle and turbine blade, for example, between the adjacent angel wing-discourager projections, when such a seal is used. The presence of the gap is understandable, that is, the clearance necessary at the junction of stationary and rotating components. However, the gap still provides a path which can allow hot core gas to exit the hot gas path into the wheel-space area of the turbine engine.

As alluded to above, the leakage of the hot gas by this pathway is disadvantageous for a number of reasons. First, the loss of hot gas from the working gas stream causes a resultant loss in energy available from the turbine engine. Second, ingestion of the hot gas into turbine wheel-spaces and other cavities can damage components which are not designed for extended exposure to such temperatures, such as the nozzle structure support and the rotor wheel.

One well-known technique to further minimize the leakage of hot gas from the working gas stream involves the use of coolant air, that is, "purge air." In a typical design, the air can be diverted or "bled" from the compressor, and used as high-pressure cooling air for the turbine cooling circuit. Thus, the coolant air is part of a secondary flow circuit which can be directed generally through the wheel-space cavity and other inboard regions. In one specific example, the coolant air can be vented to the rotor/stator interface.

Thus, the coolant air can function to maintain the temperature of certain engine components under an acceptable limit. However, the coolant air can serve an additional, specific function when it is directed from the wheel-space region into one of the gaps described previously. This counter-flow of coolant air into the gap provides an additional barrier to the undesirable flow of hot gas out of the gap and into the wheel-space region.

While coolant air from the secondary flow circuit is very beneficial for the reasons discussed above, there are drawbacks associated with its use as well. For example, the extraction of air from the compressor for high pressure cooling and cavity purge air consumes work from the turbine, and can be quite costly in terms of engine performance. Moreover, in some engine configurations, the compressor system may fail to provide purge air at a sufficient pressure during at least some engine power settings. Thus, hot gases may still be ingested into the wheel-space cavity.

It should be apparent from this discussion that new techniques for reducing the leakage of hot gases from a hot gas flow path into undesirable regions within a turbine engine or other type of turbomachine would be welcome in the art. Moreover, reduction of the cooling and cavity purge-air flow which is typically required to reduce the hot gas leakage would itself have other important benefits. For example, higher core air flow would be possible, thereby increasing the energy available in the hot gas flow path.

New techniques for accomplishing these goals must still adhere to the primary design requirements for a gas turbine engine or other type of turbomachine. In general, overall engine efficiency and integrity must be maintained. Any change made to the engine or specific features within the engine must not disturb or adversely affect the overall hot gas and coolant air flow fields. Moreover, the contemplated improvements should not involve manufacturing steps or changes in those steps which are time-consuming and uneconomical. Furthermore, the improvements should be adaptable to varying designs in engine construction, for example, different types of stator-rotor assemblies. It would also be very advantageous if the improvements were adaptable to the containment of lower-temperature gases (for example, room temperature), as well as hot gases.

BRIEF DESCRIPTION OF THE INVENTION

One embodiment of this invention is directed to a stator-rotor assembly, comprising at least one interface region between a surface of the stator and a surface of the rotor. The surfaces are separated by at least one gap. At least one stator or rotor surface in the interface region comprises a pattern of inverted turbulators. Various turbomachines which can contain such a stator-rotor assembly also represent part of this inventive concept.

A method for restricting the flow of gas through a gap between a stator and rotor in a turbine engine stator-rotor assembly represents another embodiment of this invention. The method comprises the step of forming a pattern of inverted turbulators on at least one surface of the stator or rotor which is adjacent the gap, wherein the inverted turbulators have a size and shape sufficient to impede the gas flow.

BRIEF DESCRIPTION OF THE DRAWINGS

FIG. 10 is another enlarged view of the cross-sectional turbine portion of FIG. 1 showing placement of inverted turbulators.

FIG. 11 is another enlarged view of the cross-sectional turbine portion of FIG. 1 showing another placement of inverted turbulators.

DETAILED DESCRIPTION OF THE INVENTION

Figure 1:
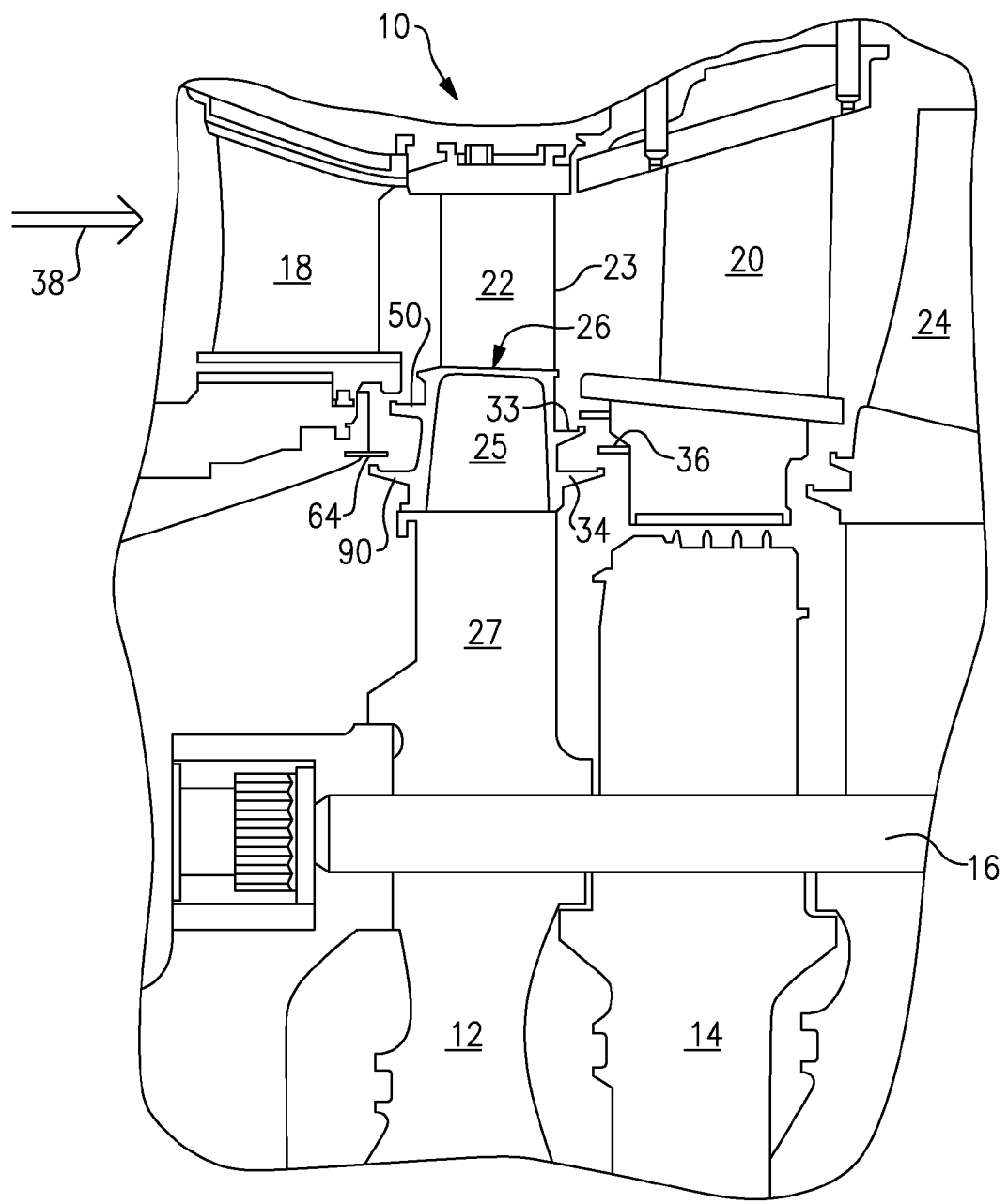
FIG. 1 is a schematic illustration of a cross-section of a portion of a gas turbine.

FIG. 1 is a schematic illustration of a section of a gas turbine engine, generally designated with numeral 10. The engine includes axially-spaced rotor wheels 12 and spacers 14, joined to each other by a plurality of circumferentially spaced, axially extending bolts 16. The turbine includes various stages having nozzles, for example, first-stage nozzle 18 and second-stage nozzle 20, comprised of a plurality of circumferentially spaced stator blades. Between the nozzles and rotating with the rotor are a plurality of rotor blades or buckets, the first and second-stage rotor blades 22 and 24, respectively, being illustrated.

Each rotor blade, for example, blade 22, includes an airfoil 23 mounted on a shank 25, which includes a platform 26. Some of the other detailed features of the rotor blades are not specifically illustrated here. Shank 25 includes a dovetail 27, for connection with corresponding dovetail slots formed on rotor wheel 12.

Blade or bucket 22 includes axially projecting angel wings 33, 34, 50 and 90 (sometimes called "angel wing seals"), as depicted in FIG. 1. The angel wings are typically integrally cast with the blade. As described previously, they are generally in opposing position to "lands" or discouragers 36 and 64, which protrude from the adjacent nozzles 20 and 18, respectively. As one example, discourager 64 is shown in an opposing, overlapping position, relative to angel wing 90. The hot gas path in a turbine of this type is generally indicated by arrow 38. As alluded to above, in some instances, the angel wing and discourager may not quite overlap each other, but may be in opposing, proximate alignment with each other, for example, tip to tip. Usually, the tips in that instance would be directly aligned, although their relative vertical position, as viewed in the figure, could vary somewhat, as long as a sufficient flow restriction is maintained.

Figure 2:
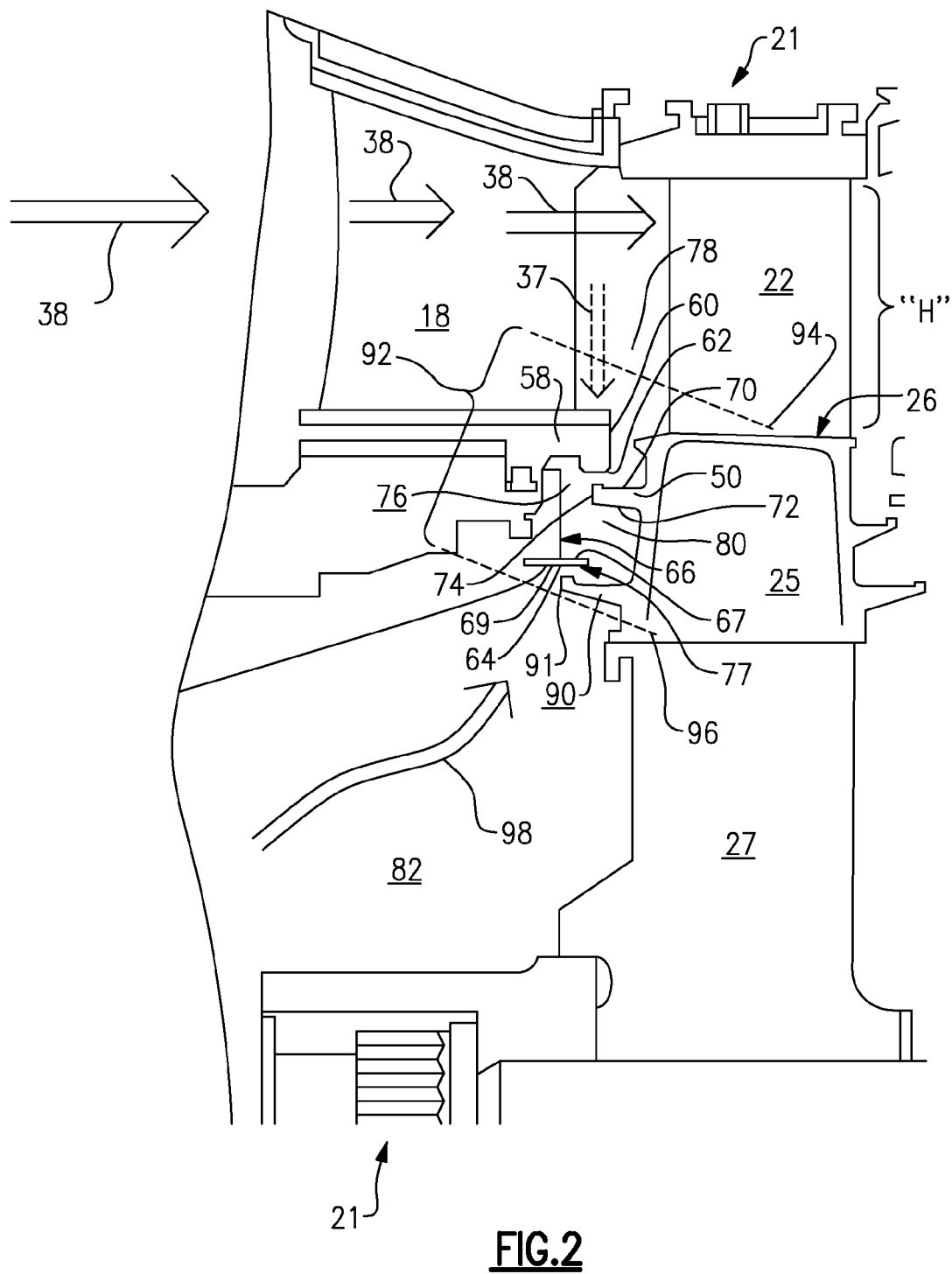
FIG. 2 is an enlarged view of the cross-sectional turbine portion of FIG. 1.

FIG. 2 is an enlarged view of a portion of the engine depicted in FIG. 1, with emphasis on the general region featuring first stage nozzle (stator) 18 and first stage rotor blade 22. (The region can be referred to as the "stator-rotor assembly", designated as element 21 in FIG. 2). Nozzle 18 includes discourager 58, that is, a protruding portion (end-wall) of the nozzle structure which is shaped to function as part of a gas flow restriction scheme, as mentioned previously. The discourager typically features various surfaces which are of special interest for this disclosure. They include radial face 60, along with lower discourager face 62. Nozzle 18 also includes discourager 64, positioned in this design near the lower terminus of radial stator face 66. Discourager 64 includes an upper surface 67 and a lower surface 69.

With continued reference to FIG. 2, angel wing 50 extends from shank 25 of rotor blade 22. The angel wing includes upper sealing surface 70 and lower sealing surface 72. While the wing in this instance terminates with "upturn" or tip 74, such a feature is not always employed. In fact, the shape and the size of the angel wing (or any other type of discourager-segment attached to blade 22) can vary greatly. All such variations are within the scope of the elements of the present invention. As mentioned above, FIG. 2 depicts lower angel wing 90 as well also extending from shank 25.

It is evident from FIG. 2 that some of the portions of nozzle 18 and blade 22 face each other in an interface region 92. The facing surfaces are separated by at least one gap (two gaps are shown here, as described below). Thus, upper gap 76 generally lies between lower discourager face 62 and angel wing tip 74. Lower gap 77 generally lies between lower surface 69 of discourager 64 and the tip 91 of angel wing 90. In this instance, gaps 76 and 77 generally define buffer cavity 80, and provide a pathway between axial gap 78 and the "inboard" regions of the turbine engine, for example, wheel-space region 82.

The term "interface region" is used herein to describe the general area of restricted dimension which includes gaps 76 and 77, along with the surrounding portions of nozzle 18 and blade 22. For the purpose of general illustration, interface region 92 in FIG. 2 is shown as being bounded by dashed boundary lines 94 and 96. The precise boundary for the interface region will vary in part with the particular design of the stator-rotor assembly. One exemplary manner in which to define a typical interface region would depend on the length (viewed as "height" in FIG. 2) of rotor blade 22. Thus, if the height of blade 22 within hot gas path 38 is designated as "H", the interface region (upper boundary line 94) can be estimated as extending from platform 26 up to about 10% of height H.

In terms of the "inboard" region of the stator-rotor assembly (that is, for lower boundary line 96), the interface region can be estimated to extend that same length (about 10% of H) below the lowest portion of the most inboard discourager, that is, lower angel wing 90. (Boundary line 96 would thus also always extend across wheel space region 82 to include the lowest discourager on the stator, that is, discourager 64 in FIG. 2). The interface region can often be referred to as a "flow-restriction" region.

In accordance with normal engine operation, combustion gas being directed into the engine along hot gas path 38 flows aftward through stator-rotor assembly 21, continuing through other stator-rotor assemblies in the engine. (Technically, the combustion gas should be referred to as "post-combustion" at this stage. Moreover, it should be understood that the "hot gas" is often a mixture of gases. While the mixture is usually dominated by post-combustion gases, it may also include various coolant injections and coolant flow, for example from nozzle 18 and/or from coolant air stream 98, discussed below). As the hot gas stream enters axial gap 78, a portion of the gas stream (dashed arrow 37) may escape through upper gap 76 and flow into buffer cavity 80. (In some extreme situations which would be very unusual, the hot gas could continue to move through lower gap 77 and enter wheel-space region 82). As mentioned above, coolant air, indicated by arrow 98, is usually bled from the compressor (not shown) and directed from the inboard region of the engine (for example, wheel-space 82) into buffer cavity 80 to counteract the leakage of hot gas. The deficiencies which sometimes are present in such a gas flowpath system were previously described.

According to one embodiment, at least one of the stator or rotor surfaces within interface region 92 is provided with a pattern of inverted turbulators. As hot gas (for example, the post-combustion gases) flows over the inverted turbulators, the gas flow is impeded. Although the inventor does not wish to be bound to any particular theory for this phenomenon, it appears that each inverted turbulator generates a local, flow vortex as the fluid stream moves thereover. Moreover, for intersecting inverted turbulators, additional flow vortices are created through the interaction of the flows of the individual inverted turbulators. As the vortices are expelled into the fluid stream, they restrict gas flow. In this manner, leakage of hot gas from the primary flow path into the wheel-space region— already obstructed in part by the discourager-angel wing structures—is further restricted.

As used herein, the term "inverted turbulator" is meant to embrace a very wide variety of short or long continuous-like features. For example, the "inverted turbulator" may be a straight or non-straight (or arcuate) continuously-formed feature, such as a groove, depression, indentation, dimple, pit, and the like. In one example of a non-straight inverted turbulator, the inverted turbulator may be a continuously-formed hemi-spherical-shaped groove having a zig-zag shape.

Figure 3:
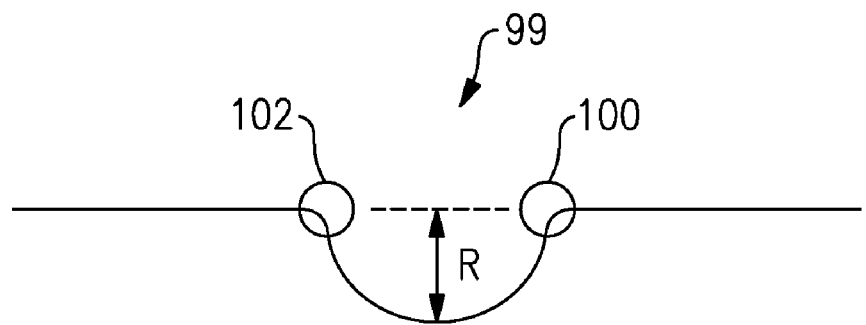
FIG. 3 is a partial, side-elevation view of an article surface that includes an inverted turbulator.
Figure 4:
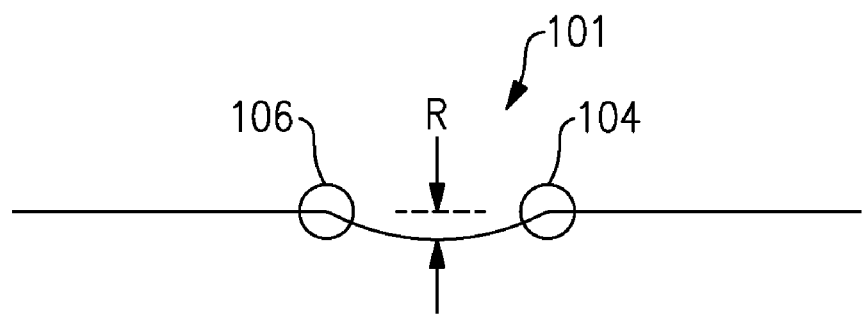
FIG. 4 is a partial, side-elevation view of another article surface that includes an inverted turbulator.

FIGS. 3 and 4 are non-limiting, cross-sectional illustrations of various hemispherical shapes possible for inverted turbulators 99, 101, respectively. In FIG. 3, a full hemisphere is shown, that is, with a depth equivalent to the full radius R. FIG. 4 depicts a much shallower inverted turbulator. Moreover the surface edge of the inverted turbulator can vary as well. In FIG. 3, surface edges 100 and 102 are depicted as somewhat rounded, while in FIG. 4, surface edges 104 and 106 are depicted as relatively sharp. (Furthermore, different portions of the surface edges for a given inverted turbulator can also vary in shape, for example, depending on how they are positioned relative to a particular gas flow stream).

As is evident from exemplary FIGS. 3 and 4, the depth of the inverted turbulators can vary considerably. Factors which are relevant to selection of optimum depth include the type and speed of gas flow over the inverted turbulators (in one or more streams); the degree to which gas flow should be restricted; the shape and size of the stator and/or rotor surfaces on which the inverted turbulators are located; the manner in which the inverted turbulators are to be formed; and the size of the local stator-rotor gap region. In general, the depth of the inverted turbulators for a typical stator-rotor assembly in a commercial turbomachine will vary from about 0.5 mm to about 6 mm. In the case of hemispherical or partially-hemispherical inverted turbulators, the depth will typically range from about 0.5 mm to about 6 mm, and more often, from about 0.5 mm to about 2.5 mm. Those skilled in the art will be able to select the most appropriate inverted turbulator depth for a given situation, based on the factors mentioned above, as well as fluid flow studies, discharge coefficient tests, computational fluid dynamics predictions, and the like.

Figure 5:
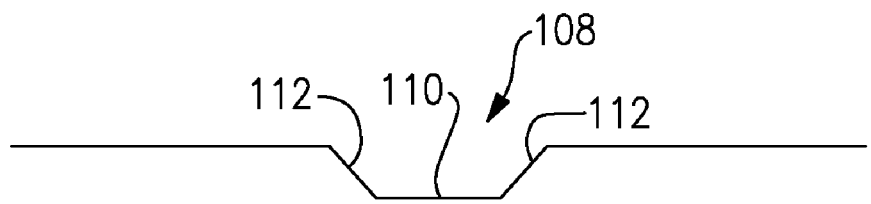
FIG. 5 is another partial, side-elevation view of an article surface that includes a type of inverted turbulator.

As mentioned above, inverted turbulators with other shapes are also possible. As one non-limiting illustration, the inverted turbulator 108 (FIG. 5) could have a relatively flat bottom surface 110, along with slanted sidewalls 112, so that the opening of the inverted turbulator has a greater area than its bottom 110. The degree of inclination of the sidewalls can vary significantly, depending on many of the other factors set forth herein.

The inverted turbulators can be arranged in a variety of many different patterns. The particular pattern selected will depend in part on many of the factors listed above, in regard to inverted turbulator shape and size. Usually, though not always, they are uniformly spaced from each other.

Figure 7:
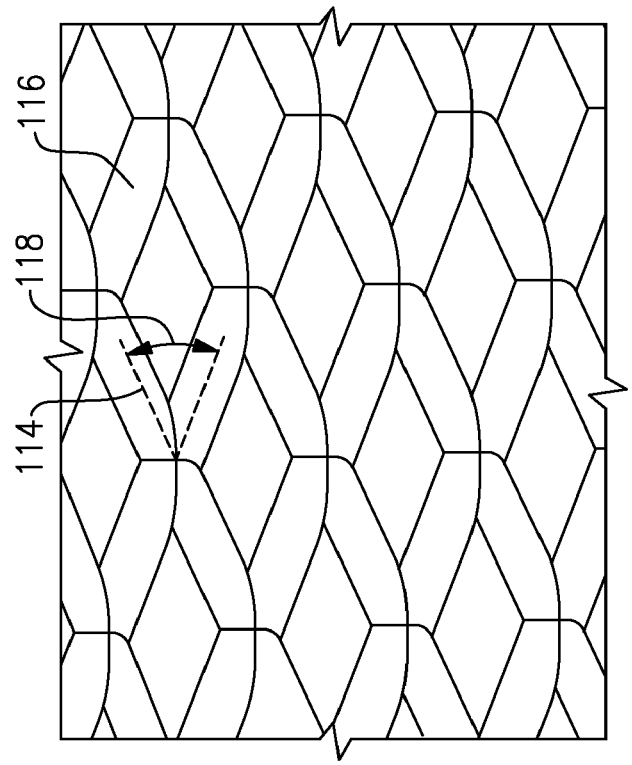
FIG. 7 is an enlarged view of the article surface of FIG. 6.
Figure 6:
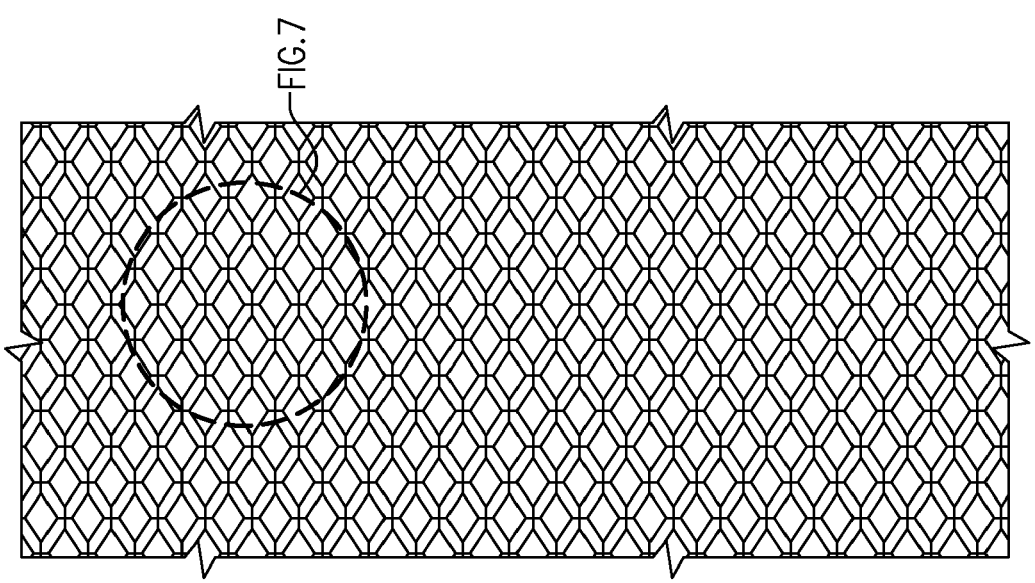
FIG. 6 is partial front view of an article surface that includes a type of inverted turbulator.
Figure 8:
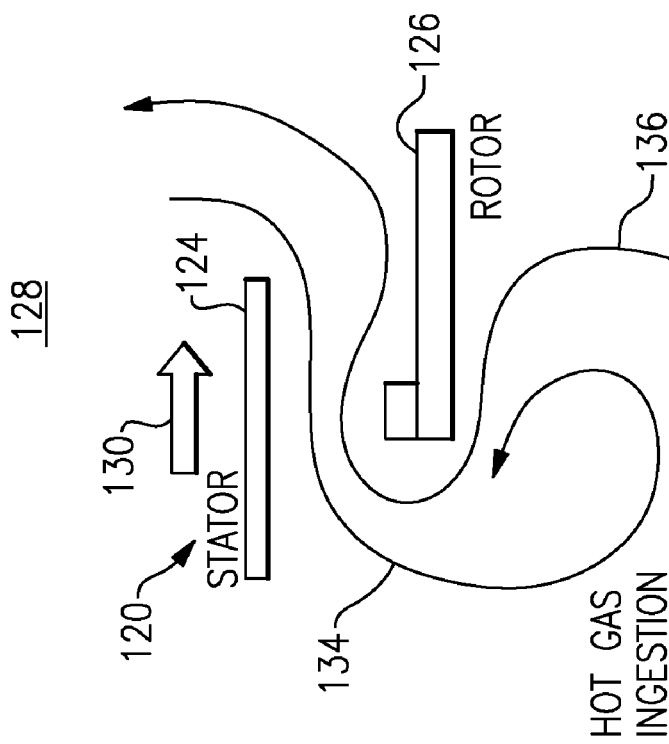
FIG. 8 is a simplified illustration of comparative fluid flows through an exemplary stator-rotor gap without inverted turbulators.

In one example shown in FIGS. 6 and 7, inverted turbulators 114 are angled in one direction along the length of the surface, while similar inverted turbulators 116 are angled in the opposite direction, thus creating a criss-cross pattern or an array of spaced apart inverted turbulators to restrict leakage of hot gas 134 into inboard region 132 (FIG. 8). The criss-crossed inverted turbulators 114, 116 may be of uniform cross-section (as shown), or may be of non-uniform cross-section. In the illustrated embodiment, the criss-cross pattern is formed by a plurality of parallel rows of inverted turbulators having a relative angle 118 of less than 90 degrees and a substantially equidistant spacing between the rows. However, the spacing between the rows of inverted turbulators need not be equidistant. In addition, the angle 118 can vary between adjacent rows and may be in the range between about 0 degrees (that is, a plurality of substantially non-intersecting, parallel horizontal rows) and about 90 degrees (that is, a plurality of substantially intersecting, perpendicular rows).

The distance between inverted turbulators 114, 116 can also vary to some extent. (The distance herein is expressed as the ratio of center-to-center spacing, divided by the surface width of the inverted turbulator). In the case of a typical turbine engine stator-rotor assembly, the center-to-center spacing between adjacent rows can be about 1 to about 6 times the surface width of the inverted turbulator, and more preferably, about 2 to about 4 times the surface width of the inverted turbulator. Fluid flow studies like those mentioned above can be used to readily determine the most appropriate pattern of inverted turbulators for a given situation. It should also be noted that the pattern itself could be varied along different surface sections of the stator and/or rotor.

The inverted turbulators can be formed by a variety of methods. Non-limiting examples include machining methods, such as various milling techniques. Other machining processes which are possible include electro-discharge machining (EDM) and electro-chemical machining (ECM). In some cases, the inverted turbulators could be formed during casting of the particular component, for example, the investment-casting of a turbine rotor or nozzle. As one example, an investment mold surface could be provided with a selected pattern of positive features, for example, rounded strips, beveled edge strips, or any other type of protrusions or turbulation. The shape of the positive features would be determined by the desired shape of the inverted turbulators, which would be inverse to the positive feature. Thus, after removal of the mold, the part would include the selected pattern of inverted turbulators. Those skilled in the art will be able to readily determine the most appropriate technique (or combination of techniques) for forming the inverted turbulators on a given surface.

Figure 9:
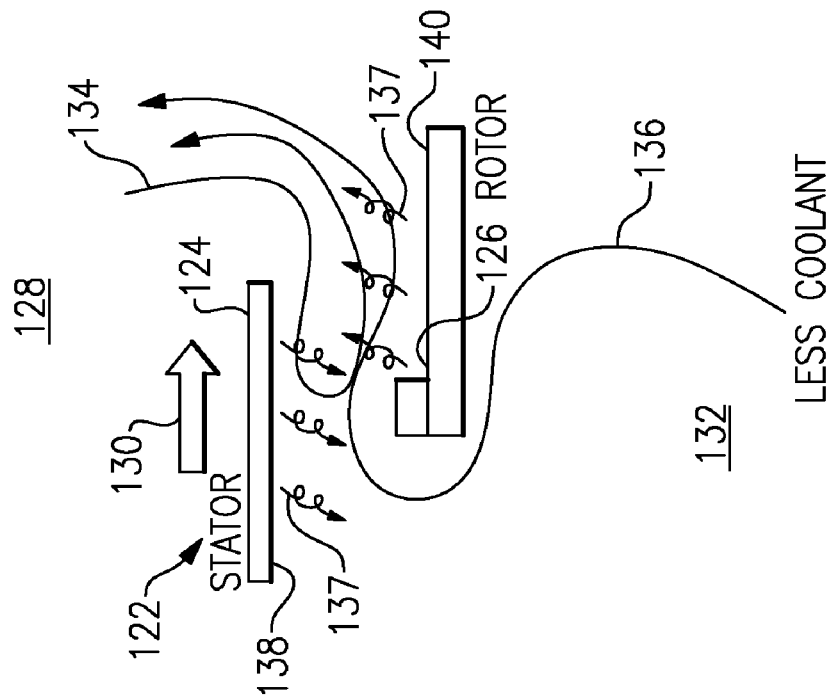
FIG. 9 is a simplified illustration of comparative fluid flows through an exemplary stator-rotor gap with inverted turbulators.

FIGS. 8 and 9 are simplified depictions according to some embodiments illustrating the benefits of providing inverted turbulators in the stator-rotor assembly of a turbomachine. For assemblies 120 and 122, sections of the stator and rotor are represented by monolithic plates 124 and 126, respectively. The hot gas flow within the hot gas flow region 128 is indicated by arrow 130. The flow of hot gas from flow region 128 into inboard region 132 (for example, a wheel-space region) is indicated by flow arrow 134. The flow of coolant to counteract the hot gas flow is indicated by flow arrow 136. In the case of assembly 120 shown in FIG. 8, no inverted turbulators are present on any of the stator or rotor surfaces. Hot gas flow 134 extends substantially into inboard regions 132 of the turbomachine, where it can sometimes damage wheels, disks, and other temperature-sensitive components.

With reference to FIG. 9, stator-rotor assembly 122 includes inverted turbulators 137 on a lower surface 138 of stator 124, and on an upper surface 140 of rotor 126. The actual shape and size of the inverted turbulators is not shown from this view. Instead, they are represented by the "swirl" shapes. (As mentioned above, one theory includes the proposition that a vortex is formed within each inverted turbulator as gas flows thereover). As shown for assembly 122, the presence of the inverted turbulators can greatly restrict leakage of hot gas 134 into inboard region 132. Thus, the hot gas can effectively be "turned back" into hot gas region 128, without ingestion into sensitive regions of the turbine engine. As a further consequence, coolant flow 136 does not have to be as substantial as in the case of assembly 120, leading to other benefits described herein.

The inverted turbulators can be formed on a variety of surfaces of the stator, the rotor, or both the stator and rotor. (In some cases, the inverted turbulators need only be formed on portions of those surfaces). As an example, they can be placed on various surfaces of one or more stator discourager seals which extend into one of the gaps in the interface region. As described previously, they can also be formed on various surfaces of one or more angel wings (on the rotor) which extend into one of the gaps.

In some types of stator-rotor assemblies, considerable benefit is obtained from incorporating the inverted turbulators into a surface of the discourager, and a substantial benefit is not obtained from incorporating the inverted turbulators into surfaces of the rotor blade. However, the level of effectiveness for the inverted turbulators will depend on the many factors discussed herein, including size, shape, and precise location of the features, along with the particular design of the stator-rotor assembly. Thus, in some types of stator-rotor assemblies, it is expected that the presence of inverted turbulators on various sections of the rotor will also provide the substantial benefits discussed herein.

The figures attached hereto are generally drawn according to a two-dimensional perspective, in order to simplify review of this disclosure. However, it should be understood that the interface regions described herein are typically part of a rotational arrangement. Thus, it is usually important that the inverted turbulators be applied in patterns which generally surround the entire circumference of the particular component, that is, rotor or stator.

FIG. 10 is another view of the turbine engine portion of FIGS. 1 and 2, enlarged to a much greater extent. In FIG. 10, non-limiting examples of the specific placement of inverted turbulators are provided, on various sections of the stator (nozzle) 18 and/or the rotor blade (bucket) 22. The possible locations of the inverted turbulators are indicated with the various arrow symbols. From FIG. 10, it is clear that the inverted turbulators can be incorporated into a variety of radially-inboard portions of the stator, including, for example, radial face 60 (facing trench cavity 54), lower discourager face 62 (facing upper gap 76), and stator face 66. The inverted turbulators can also be incorporated into various stator regions associated with lower gap 77, such as the various surfaces of discourager 64. FIG. 10 also illustrates the placement of inverted turbulators on angel wings 50 and 90. Many different regions of each angel wing 50, 90 could include the inverted turbulators, for example, the upper sealing surface 70 of angel wing 50, along with its tip 74. The use of inverted turbulators in these regions can actually allow increases in the upper and lower gaps 76, 77 and buffer cavity 80 to some degree, while still retaining the effective flow resistance. An increase in the dimension of the physical gap can relieve other constraints on machining tolerances and assembly-fits, thereby providing additional manufacturing advantages. (This is a benefit in the case of the upper gap regions as well).

For example, one possible location of inverted turbulators in the interface region 92 of the stator-rotor assembly is shown in FIG. 11. In FIG. 11, a non-limiting example of the specific placement of inverted turbulators is provided on various sections of the stator (nozzle) 18 and/or the rotor blade (bucket) 22. The possible locations of the inverted turbulators are indicated with the various arrow symbols. Similar to the placement in FIG. 10, the inverted turbulators are placed on the radially-inboard portions of the stator, including, for example, radial face 60 (facing trench cavity 54), lower discourager face 62 (facing upper gap 76), and stator face 66. The inverted turbulators can also be incorporated into various stator regions associated with lower gap 77, such as the upper and lower surfaces 67, 69 of discourager 64. Unlike the placement shown in FIG. 10, the inverted turbulators in FIG. 11 are not used on the angel wings 50, 90. In FIG. 11, the inverted turbulators are located on each side of the upper and lower gaps 76, 77 formed by the wings 50, 90 and the discouragers 58, 64, respectively. Specifically, the inverted turbulators on the surfaces that extend for a specific length on each side of the gaps 76, 77 that is approximately equal to the surface length the discourager 58, 64 itself. In other words, the inverted turbulators extend on each side of the gaps 76, 77 only to the extent of the length of the surface of the discourager 58, 64. The use of inverted turbulators only in these regions can actually allow increases in the upper and lower gaps 76, 77 and buffer cavity 80 to some degree, while still retaining the effective flow resistance.

The present disclosure has exemplified stator-rotor assemblies in the turbine section of a turbomachine. However, it should also be emphasized that stator-rotor assemblies in other sections of such a machine can also benefit from the invention. As a non-limiting illustration, the compressor sections in many turbomachines also include stator-rotor assemblies which can incorporate angel wing-discourager arrangements. As in the case of the turbine, this construction is a sealing mechanism (for example, through different compressor stages), although the gas is generally at a lower temperature. Thus, use of the inverted turbulators in stator-rotor assemblies in the compressor can also be very advantageous for restricting gas flow. (In general, it should be clear that the present invention is suitable for the containment of gas at any temperature, for example, room temperature or above).

Another embodiment of the present invention is directed to a turbomachine, which includes at least one stator-rotor assembly, such as those described above. Gas turbine engines (for example, turbojets, turboprops, land-based power generating turbines, and marine propulsion turbine engines), represent examples of a turbomachine. Other types are known in the art as well. Non-limiting examples include a wide variety of pumps and compressors, which also happen to incorporate a stator-rotor assembly through which fluids (gas or liquid) flow. In many of these other turbomachine designs, new techniques for reducing the leakage of fluid from a flow path into other regions of the machine would be of considerable interest. Thus, the stator-rotor assemblies in any of these turbomachines could include patterns of inverted turbulators as described in this disclosure.

Still another embodiment of this invention is directed to a method for restricting the flow of gas (for example, hot gas) through a gap between a stator and rotor in a turbomachine. As described previously, the method includes the step of forming a pattern of inverted turbulators on at least one surface of the stator or rotor which is adjacent the gap. The inverted turbulators have a size and shape sufficient to impede the gas flow, as also described above. Exemplary methods to form the inverted turbulators have also been provided in this disclosure.

Although this invention has been described by way of specific embodiments and examples, it should be understood that various modifications, adaptations, and alternatives may occur to one skilled in the art, without departing from the spirit and scope of the claimed inventive concept. All of the patents, articles, and texts mentioned above are incorporated herein by reference.

What is claimed:

1. A stator-rotor assembly, comprising at least one interface region between a surface of the stator and a surface of the rotor, said surfaces being separated by at least one gap, wherein at least one of the stator or rotor surfaces in the interface region comprises a criss-cross pattern of inverted turbulators formed by a first plurality of rows of inverted turbulators having an angle relative to a second plurality of rows of inverted turbulators, wherein the stator is a nozzle, and the pattern of inverted turbulators is disposed on at least one inboard surface of the nozzle.

2. A stator-rotor assembly, comprising at least one interface region between a surface of the stator and a surface of the rotor, said surfaces being separated by at least one gap, wherein at least one of the stator or rotor surfaces in the interface region comprises a criss-cross pattern of inverted turbulators formed by a first plurality of rows of inverted turbulators having an angle relative to a second plurality of rows of inverted turbulators, wherein the stator is a nozzle which comprises at least one discourager seal having a segment which extends into the gap, and the pattern of inverted turbulators is disposed on at least one surface of the segment.

3. A stator-rotor assembly, comprising at least one interface region between a surface of the stator and a surface of the rotor, said surfaces being separated by at least one gap, wherein at least one of the stator or rotor surfaces in the interface region comprises a criss-cross pattern of inverted turbulators formed by a first plurality of rows of inverted turbulators having an angle relative to a second plurality of rows of inverted turbulators, wherein the rotor is a turbine blade or bucket.

4. The assembly of claim 3, wherein the turbine blade or bucket comprises at least one angel wing which extends into the gap, and a pattern of inverted turbulators is disposed on at least one surface of the angel wing.

5. The assembly of claim 4, wherein the angel wing comprises an upper sealing surface situated closest to a hot gas flow path in the turbine engine, and a lower sealing surface generally opposite the upper sealing surface, wherein the pattern of inverted turbulators is disposed on at least a portion of the upper sealing surface.

6. The assembly of claim 1, wherein the inverted turbulators are in the shape of a hemisphere or a partial hemisphere.

7. The assembly of claim 6, wherein each inverted turbulator has an average depth in the range of about 0.5 mm to about 6 mm.

8. The assembly of claim 1, wherein the inverted turbulators have a bottom surface which is relatively flat.

9. The assembly of claim 8, wherein the inverted turbulators comprise sidewalls which are slanted relative to the bottom surface such that the opening of each inverted turbulator has a greater area than the bottom surface.

10. The assembly of claim 1, wherein the angle is less than 90 degrees.

11. A stator-rotor assembly, comprising at least one interface region between a surface of the stator and a surface of the rotor, said surfaces being separated by at least one gap, wherein at least one of the stator or rotor surfaces in the interface region comprises a criss-cross pattern of inverted turbulators formed by a first plurality of rows of inverted turbulators having an angle relative to a second plurality of rows of inverted turbulators, wherein the interface region between the stator and rotor surfaces is a flow-restriction region which limits the flow of gas from the hot flow path of the turbine engine, through the gap, to a wheel-space region of the stator-rotor assembly.

12. The assembly of claim 11, wherein the inverted turbulators have a shape and size that provide an additional restriction of gas from the hot flow path through the gap.

13. A turbomachine comprising at least one stator-rotor assembly, wherein the stator-rotor assembly comprises at least one interface region between a surface of the stator and a surface of the rotor, said surfaces being separated by at least one gap, wherein at least one of the stator or rotor surfaces in the interface region comprises a criss-cross pattern of inverted turbulators formed by a first plurality of rows of inverted turbulators having an angle relative to a second plurality of rows of inverted turbulators, the turbomachine further comprising at least one turbine section and at least one compressor section, wherein the stator-rotor assembly which comprises the inverted turbulators is located in the turbine section or in the compressor section.

14. The turbomachine of claim 13, comprising stator-rotor assemblies in both the turbine section and the compressor section which comprise the inverted turbulators.

15. A gas turbine engine comprising a stator-rotor assembly having at least one interface region which lies between a surface of the stator and a surface of the rotor, said surfaces being separated by at least one gap, wherein the stator is a nozzle which comprises at least one discourager seal extending into the gap, and the rotor is a blade which comprises at least one angel wing extending into the gap, and the discourager seal and the angel wing generally oppose each other to define the gap, wherein a surface of the discourager seal comprises a criss-cross pattern of inverted turbulators formed by a first plurality of rows of inverted turbulators having an angle relative to a second plurality of rows of inverted turbulators.

16. A method for restricting the flow of gas through a gap between a stator and rotor in a stator-rotor assembly of a turbomachine, comprising the step of forming a criss-cross pattern of inverted turbulators formed by a first plurality of rows of inverted turbulators having an angle relative to a second plurality of rows of inverted turbulators on at least one surface of the stator or rotor which is adjacent the gap, wherein the inverted turbulators have a size and shape that impede the gas flow, wherein the inverted turbulators are formed during a casting process used to manufacture the stator or the rotor.

17. The method of claim 16, wherein the casting process comprises investment casting.

18. A method for restricting the flow of gas through a gap between a stator and rotor in a stator-rotor assembly of a turbomachine, comprising the step of forming a criss-cross pattern of inverted turbulators formed by a first plurality of rows of inverted turbulators having an angle relative to a second plurality of rows of inverted turbulators on at least one surface of the stator or rotor which is adjacent the gap, wherein the inverted turbulators have a size and shape that impede the gas flow, wherein the gas is hot gas.

19. The method of claim 18, wherein the hot gas comprises post-combustion gas.

* * * * *

UNITED STATES PATENT AND TRADEMARK OFFICE
CERTIFICATE OF CORRECTION

PATENT NO.       : 7,967,559 B2                                    Page 1 of 1
APPLICATION NO.  : 11/755588
DATED            : June 28, 2011
INVENTOR(S)      : Bunker It is certified that error appears in the above-identified patent and that said Letters Patent is hereby corrected as shown below:

In Column 6, Line 45, delete "turubulators" and insert -- turbulators --, therefor.

Signed and Sealed this
Twenty-third Day of August, 2011

David J. Kappos
*Director of the United States Patent and Trademark Office*